March 3, 1931. LE ROY C. TRESCOTT 1,794,874
APPARATUS FOR THE RECOVERY OF SOLID MATERIALS BY EXTRACTION
Filed Feb. 16, 1929
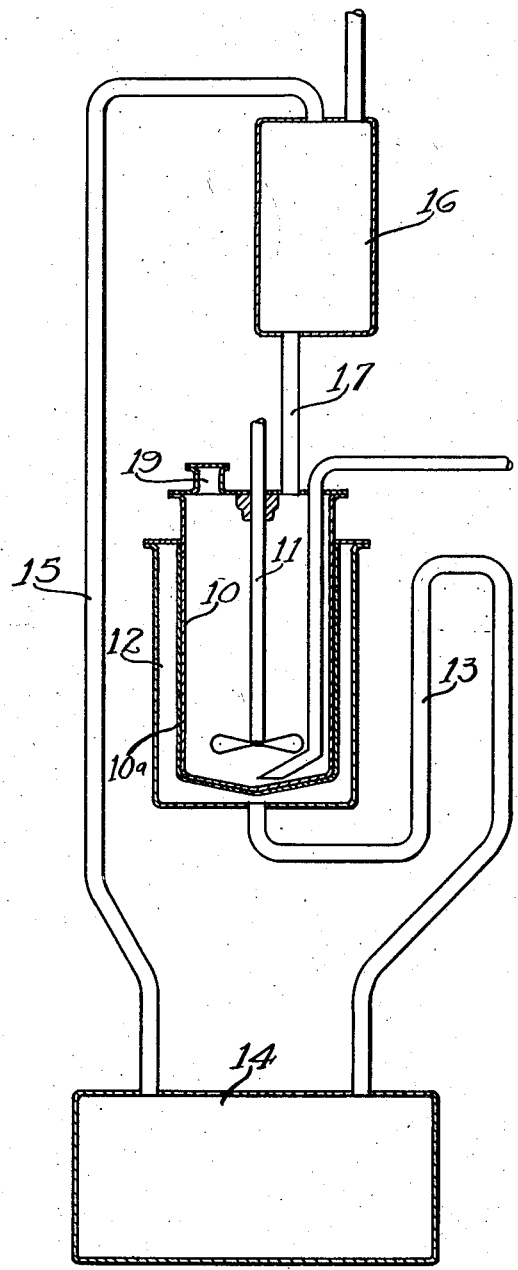
INVENTOR
L. C. Trescott.
BY
his ATTORNEY Patented Mar. 3, 1931

1,794,874

UNITED STATES PATENT OFFICE

LE ROY CHARLES TRESCOTT, OF WOODBURY, NEW JERSEY, ASSIGNOR, BY MESNE ASSIGNMENTS, TO CONTACT FILTRATION COMPANY, A CORPORATION OF CALIFORNIA

APPARATUS FOR THE RECOVERY OF SOLID MATERIALS BY EXTRACTION

Application filed February 16, 1929. Serial No. 340,482.

This invention relates to apparatus for the extraction, by liquid solvents, of pulverulent material such as the clay used in filtering oil. Apparatus of the type in question is sometimes provided with a receptacle, in the form of a drum or basket, into which the material is introduced and in which it is mixed with the solvent, said receptacle having foraminous walls so that the solvent may be drained away from the material for distillation and re-use.

Where the material is of a pulverulent character it is possible and convenient, after completion of the extraction, to withdraw it in a fluid mixture with the solvent. It is also desirable to use mechanical means, within the receptacle, for stirring the mixture of material and solvent. The object of the present invention is to provide an apparatus of the type in question, in which the foraminous receptacle may have a simple and efficient form, with all openings and connections for the introduction and removal of material and solvent, and for the intrusion of the agitating mechanism, located at the top of the receptacle, above the foraminous walls and the liquid level. To this end the invention resides in an apparatus in which the basket depends within a housing, and has a top closure in which provision is made for all of the functions just referred to.

The accompanying drawing is a vertical sectional view, partly diagrammatic in character, of an apparatus embodying the present invention.

In the illustrated embodiment of the invention, the receptacle 10 for the material to be treated has the form of a cylindrical basket, being formed of a metal frame, wire screen, or other equivalent foraminous material. The meshes of the basket 10 are conveniently covered with a layer 10a of filter cloth or any suitable equivalent, depending upon the fineness of the adsorbent material to be extracted, the layer 10a being either inside or outside the basket 10. The function of the bag or covering 10a is to hold the adsorbent within the basket 10, loss of adsorbent because of passage through the meshes of the basket being thereby avoided.

As will be seen from the drawings, the basket 10 is provided with a rotary stirrer or agitator 11, operated by any convenient source of power, and extending conveniently almost to the bottom of the basket 10, thus providing a maximum of agitation for the contents of the basket. The basket 10 is inserted within a shell 12, there being an annular space between the basket 10 and the shell or outer container, 12.

Communicating with the shell 12 is the pipe line 13 leading to still 14. The line 13 is so constructed as to form a syphon for withdrawing liquid solvents from the shell 12 and introducing the same continuously into the still 14. This still is of any convenient type well-known in the art, its purpose being solely for the vaporization of the liquid solvents introduced therein through the line 13.

The vapors produced in the still 14 are led through a pipe 15 into a condenser 16, of any conventional type, wherein the said vapors are condensed again to liquid solvent and pass back into the basket 10 through the pipe 17, the adsorbent placed in the basket 10 being thereby continuously contacted with freshly regenerated solvent.

When the adsorbent has been completely extracted, suction is applied to the pipe 18, which, as shown, leads into the shell 12 at a point adjacent the bottom thereof, the adsorbent together with entrained residual solvent being thus withdrawn from the basket 10 into a dryer, preferably a vacuum dryer, not shown, where the revivification of the adsorbent is completed. Fresh adsorbent to be extracted is then charged into the basket 10 through the opening 19, provided for this purpose.

In operating the apparatus the basket 10 is charged with the adsorbent material to be extracted, the solvent run in, and the agitator 11 started. Fresh solvent is distilled in the still 14, rises through the line 15, is condensed in the condenser 16, and returned to the basket of the extractor through the line 17. This solvent extracts oil or coloring matter, then seeps through the filter cloth, placed either on the inside or outside, as desired, of the basket 10, into the annular space between the shell 12 and the basket 10. When the level of the extract reaches the level of the top of the syphon 13, it is returned through the syphon to the still 14, where the solvent is again distilled and returned to the extractor leaving the heavier extracted component in the still. This operation is repeated until the solid adsorbent material is properly extracted. At this point suction is put in the line 18 and the extracted material, together with such solvent as remains in the basket, is drawn into a vacuum dryer, not shown, to be finished. The extractor basket is charged through the charging opening 19 with more raw material and the operation repeated.

What I claim as my invention and desire to secure by Letters Patent is:

An extraction apparatus comprising a shell for retaining solvent, a foraminous basket depending into the shell, a top closure, for the basket, provided with inlet openings for solvent and for material to be treated, a draw-off pipe extending, within the basket, from the bottom thereof through said top closure, and a rotary agitator depending, through the top closure, within the basket.

LE ROY CHARLES TRESCOTT.